(12) United States Patent
Chiang

(10) Patent No.: US 9,525,248 B2
(45) Date of Patent: Dec. 20, 2016

(54) POWER STRIP

(71) Applicant: POWERTECH INDUSTRIAL CO., LTD., New Taipei (TW)

(72) Inventor: Chih-Shang Chiang, Keelung (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 73 days.

(21) Appl. No.: 14/335,995

(22) Filed: Jul. 21, 2014

(65) Prior Publication Data

US 2015/0333455 A1 Nov. 19, 2015

(30) Foreign Application Priority Data

May 16, 2014 (TW) .............................. 103117567 A

(51) Int. Cl.
| | | |
|---|---|---|
| *H01R 3/00* | (2006.01) | |
| *H01R 13/66* | (2006.01) | |
| *H02J 3/00* | (2006.01) | |
| *H01R 25/00* | (2006.01) | |
| *H01R 13/717* | (2006.01) | |

(52) U.S. Cl.
CPC ........ *H01R 13/6691* (2013.01); *H01R 13/717* (2013.01); *H01R 13/7175* (2013.01); *H01R 25/003* (2013.01); *H02J 3/00* (2013.01)

(58) Field of Classification Search
CPC ............ H01R 13/6691; H01R 13/7175; H01R 25/003; H01R 31/065; H01R 13/70; H01R 13/46; Y10T 307/549
USPC ....................................................... 439/488
See application file for complete search history.

(56) References Cited

U.S. PATENT DOCUMENTS

| | | | | |
|---|---|---|---|---|
| 6,908,334 | B2 * | 6/2005 | Huang ................. | H01R 13/465 439/491 |
| 8,417,980 | B1 * | 4/2013 | Mimberg ................. | G06F 1/26 323/234 |
| 2005/0103642 | A1 * | 5/2005 | Carson ............... | A61B 19/0288 205/688 |
| 2005/0121430 | A1 * | 6/2005 | Samodell ............. | B23K 9/1043 219/130.1 |

(Continued)

FOREIGN PATENT DOCUMENTS

| | | |
|---|---|---|
| TW | M399533 U1 | 3/2011 |
| TW | 201138237 A1 | 11/2011 |

(Continued)

*Primary Examiner* — Jean F Duverne
(74) *Attorney, Agent, or Firm* — Li & Cai Intellectual Property (USA) Office

(57) ABSTRACT

A power strip includes a power plug, an outlet block electrically connected thereto, and a light control module disposed inside the outlet block. The outlet block has at least one electrical socket and a luminous warning field. The light control module is for emitting a light to the luminous warning field in accordance with an output current of the electrical socket. The light control module defines at least two current ranges according to a rated current, where one of the current ranges is a safety current range, the upper limit of which is greater than 50% of the rated current. The light control module alters the light emitted to the luminous warning field in accordance with the correspondence between the output current and each of the current ranges, so as to make the luminousness of the luminous warning field to change in accordance with the output current.

9 Claims, 4 Drawing Sheets

(56) References Cited

U.S. PATENT DOCUMENTS

| | | | | |
|---|---|---|---|---|
| 2008/0094210 A1* | 4/2008 | Paradiso | ............ | H04L 12/2827 340/540 |
| 2015/0001937 A1* | 1/2015 | Wang | ................... | H01R 13/70 307/52 |
| 2015/0008747 A1* | 1/2015 | Salcone | ............... | H02J 7/0047 307/66 |
| 2015/0021988 A1* | 1/2015 | Barnetson | ............. | H05B 31/00 307/23 |

FOREIGN PATENT DOCUMENTS

| | | |
|---|---|---|
| TW | M426936 U1 | 4/2012 |
| TW | M427720 U1 | 4/2012 |

\* cited by examiner

POWER STRIP

BACKGROUND

1. Field of the Invention

The instant disclosure relates to a power strip, and pertains particularly to a power strip having a luminous warning field.

2. Description of Related Art

There have been an increasing number of electrical appliances used in our daily life. The electrical appliances are each provided with a plug to connect to the electric power source, resulting in an insufficient number of the user's home outlets. Thus, a power strip is used to increase the number of outlets. A power strip may include a power plug and an electrical socket connected thereto.

A conventional electrical outlet has a casing and a light source device disposed inside the casing for emitting light, thereby the users can be aware of the location of the electrical outlet.

SUMMARY OF THE INVENTION

The embodiment of the instant disclosure provides a power strip. The power strip in accordance with the instant disclosure comprises a power plug, an outlet block, and a light control module. The outlet block, which is electrically connected to the power plug, has at least one electrical socket and a luminous warning field. The light control module, which is disposed inside the outlet block, is for emitting a light to the luminous warning field in accordance with an output current of the electrical socket. The light control module defines at least two current ranges according to a rated current, where one of the current ranges is a safety current range, which has an upper limit greater than 50% of the rated current. The light control module alters the light emitted to the luminous warning field in accordance with the correspondence between the output current and each of the current ranges, so as to make the luminousness of the luminous warning field to change in accordance with the output current.

According to the embodiment of the instant disclosure, the power strip utilizes the light control module to alter the light emitted, so as to alter the luminousness of the luminous warning field in accordance with the output current of the electrical socket, which enables instant indication of the power state of the outlet.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

DETAILED DESCRIPTION OF THE PREFERRED EMBODIMENTS

The instant disclosure will be described more specifically with reference to the following embodiments. It is to be noted that the following descriptions of preferred embodiments are provided herein for purpose of illustration and description. It is not intended to be exhaustive or limiting to the precise form disclosed.

Figure 1:
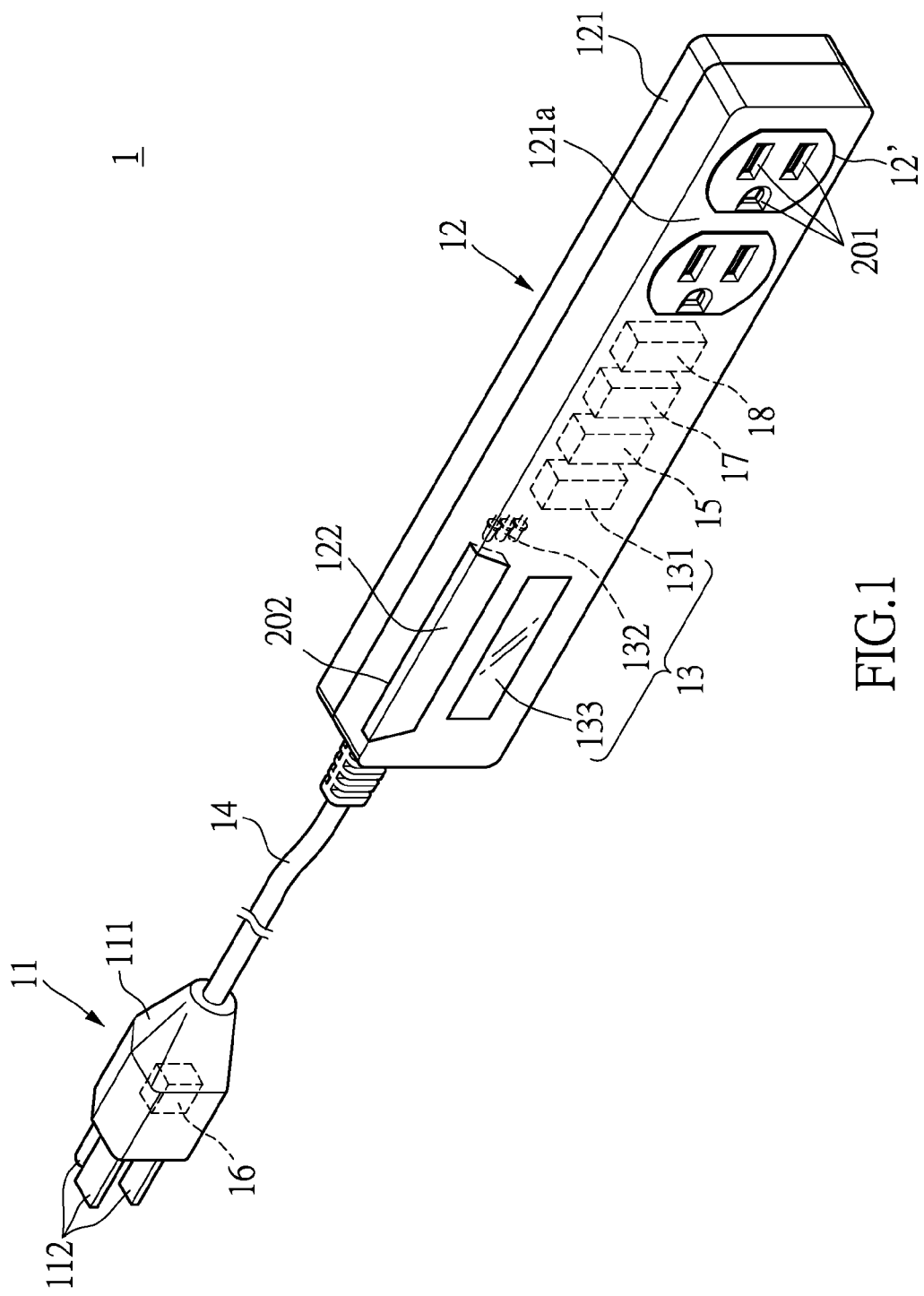
FIG. 1 illustrates a perspective view of a power strip in accordance with an embodiment of the instant disclosure.
Figure 3:
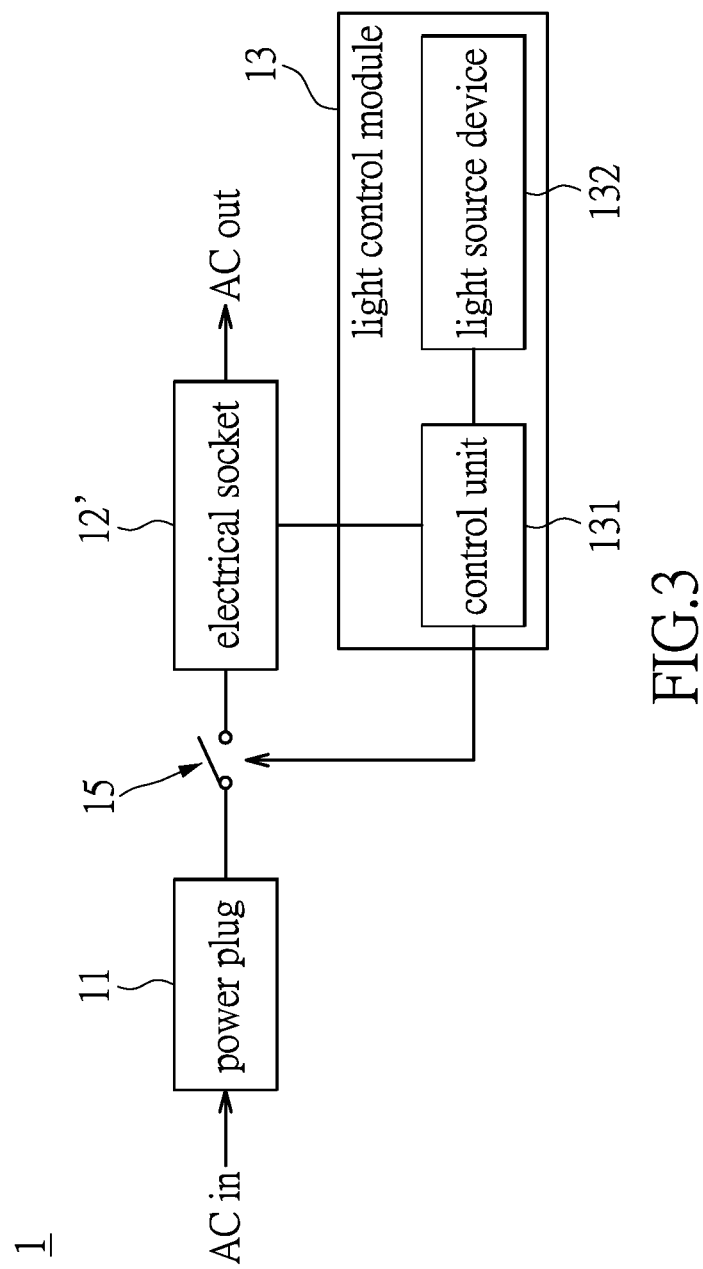
FIG. 3 illustrates a schematic circuit block diagram of the power strip in accordance with an embodiment of the instant disclosure.

Please refer concurrently to FIG. 1 and FIG. 3. FIG. 1 illustrates a perspective view of a power strip in accordance with an embodiment of the instant disclosure. FIG. 3 illustrates a schematic circuit block diagram of the power strip in accordance with an embodiment of the instant disclosure. the power strip 1 comprises a power plug 11, an outlet block 12, a cord 14, and a light control module 13 disposed inside the outlet block 12, in which the outlet block 12 is electrically connected to the power plug 11 through the cord 14, and the outlet block 12 has at least one electrical socket 12' and a luminous warning field 202.

A conventional electrical outlet disclosed in the patent TWM403794 utilizes a surface treatment on some specific positions of the optical plate as indicators. The patent TWM314952 discloses an Outlet having over-loading alarming protection, which utilizes an over-loading protection unit to cut off the supply of power only when the current at the electrically operated equipment connected to the Outlet is overloaded.

Another conventional electrical outlet disclosed in the patent TWM367493 displays the usage status of electricity in accordance with the electric power. The disclosed electrical outlet determines to display the green light, yellow light or the red light according to the value of the electrical power. Before the electrical power is overloading, these conventional electrical outlets may help to cease shorts and fires due to the overload of output current.

The power strip 1 in accordance with the embodiment of the instant disclosure can change the luminousness of the luminous warning field 202 in accordance with an output current of the electrical socket 12', so as to immediately indicate the status of the output current. Furthermore, according to a rated current, a safety current range, which has the lower limit greater than 50% of the rated current, can be defined by the power strip 1. Whereby, as long as the output current is within the safety current range, it can be sure that the power strip 1 is used properly and under a safe circumstance.

In the instant disclosure, the power strip 1 can be used as a power source device that allows electrically operated equipment to be connected to the primary alternating current power (referred to as AC power) supply. Specific structures of each component of the power strip 1 are described in detail the following descriptions.

The power plug 11 is for being plugged to an AC power supply outlet, such as an in-wall socket, for receiving AC power. The power plug 11 includes a main body 111 and at least two power pins 112 protruding from the main body 111, where the power pins 112 are allowed to be removably plugged into the AC power supply outlet. In the instant exemplary disclosure, the power plug 112 can include three power pins, which are a live pin, a neutral pin, and an earthing pin. The live pin 112 and the neutral pin 112 are electrically connected to a power-input wire 113 (FIG. 4) disposed inside the main body 111 of the power plug 11.

The outlet block 12 includes a main body 121 and an optical plate 122 embedded at one side of the main body 121. The main body 121 of the outlet block 12 has a main panel 121a, where apertures 201 of the electrical socket 12' are disposed thereon the main panel 121a. When the electrical socket 12' is providing AC power, a plug of an electrically operated equipment (not shown in the Figures) can be selectively plugged to the apertures 201 of the electrical socket 12' to be in electrical connection with conductive sheets (not shown in the Figures) disposed inside the outlet block 12, whereby the electrically operated equipment can be supplied with the AC power. In an alternative embodiment, the outlet block 12 can further have an USB receptacle or other type of interface that can supply power disposed at the main panel 121a.

Moreover, the main panel 121a has an opening corresponding to the optical plate 122 to expose at least a portion of the optical plate 122. As shown in FIG. 1, the portion of the optical plate 122 that is exposed can be defined as the luminous warning field 202. The optical plate 122 can be an elongated plate formed of light-guiding material, and/or a transparent or translucent plate. In an alternatively embodiment, a special treatment can be carried out for the optical plate 122, such as engraving pattern or text on the optical plate 122, roughening the upper surface or bottom surface of the optical plate 122, forming a recess on the optical plate 122, disposing reflective film on the optical plate 122, and disposing various light guide sheets on the optical plate 122, thereby the optical plate 122 can have various luminous effects. In the instant disclosure, the portion of the optical plate 122 that is exposed forms the luminous warning field 202 having a large area, which can indicate the current status of the power consumption by changing the color of the luminousness to achieve the messaging and alerting effect.

The light control module 13 disposed inside the outlet block 12 is for emitting the light to the luminous warning field 202 in accordance with the output current of the electrical socket 12'. To put it concretely, the light control module 13 can define at least two current ranges according to the rated current and alter the light emitted to the luminous warning field 202 in accordance with the correspondence between the output current of the electrical socket 12' and each of the current ranges, so as to make the luminousness of the luminous warning field 202 change in accordance with the output current, whereby the luminous warning field 202 can have a messaging and alerting effect. It is worth noting that, one of the current ranges is the safety current range, the upper limit of which is greater than 50% of the rated current. The rated current is one of the parameters saved in the power strip 1 and can be set up by the users according to the maximum amount of electrical current for ampere capacity defined by National Electrical Safety Codes. For example, the rated current can be 15 amperes, 10 amperes, 16 amperes, or 13 amperes, and the instant embodiment is not limited thereto.

The light control module 13 can include a control unit 131 and at least one light source device 132, where the control unit 131 can have a current measurement circuit (not shown in the Figures) for measuring the output current of the electrical socket 12' and controlling the light source device 132 to emit the light to the luminous warning field 202 according the output current of the electrical socket 12'.

Figure 2:
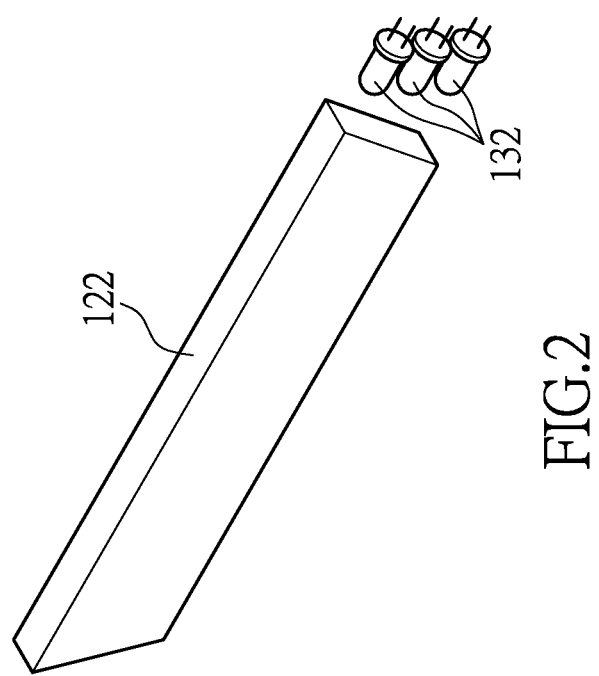
FIG. 2 illustrates structural arrangement of an optical plate and light source devices of the power strip in accordance with an embodiment of the instant disclosure.

Please refer to FIG. 2, which illustrates the structural arrangement of an optical plate and light source devices of the power strip in accordance with an embodiment of the instant disclosure. In the instant disclosure, the light source device 132 can include a plurality of LEDs, which are an LED for emitting green light, an LED for emitting yellow light, and an LED for emitting red light. These LEDs are disposed at one side of the optical plate 122 (e.g. a light guide plate). The light emitted from the LEDs can strike the side surface of the optical plate 122 and then be guided to the luminous warning field 202 (e.g. the exposed surface of the optical plate 122), whereby the luminous warning field 202 can glow.

In an exemplary embodiment, the light control module 13 defines four current ranges according to the rated current. These current ranges are the safety current range, a second current range, a third current range, and a fourth current range. The safety current range is between 0 and 75% of the rated current. The second current range is between 75% and 90% of the rated current. The third current range is between 90% and 95% of the rated current. The lower limit of the fourth current range is greater than 95% of the rated current. In an alternative disclosure, the upper limit of the safety current range is between 50% and 90% of the rated current, for example, the upper limit of the safety current range is 75% of the rated current.

The power strip 1 can include an interface, thereby an external computer or an electronic device can be coupled to a control chip disposed inside the power strip 1, and parameter values, such as the rated current and the upper limit and the lower limit of each of the current ranges, can be set up via the external computer or the electronic device by the users.

In the instant disclosure, the rated current can be set up according to the maximum amount of electrical current for ampere capacity in America, for example the rated current can be 15 amperes. Accordingly, the safety current range can be between 0 and 11.25 amperes; the second current range can be between 11.25 and 13.5 amperes; the third current range can be between 13.5 and 14.25 amperes, and the lower limit of the fourth current range can be 14.25 amperes.

In accordance with each of the current ranges, the luminous warning field 202 can have different luminous effect. The light control module 13 alters the light emitted to the luminous warning field 202 in accordance with the correspondence between the output current and the current ranges, whereby the luminous warning field 202 can alter its luminous effect in accordance with the output current. For example, in accordance with the safety current range, the luminous warning field 202 emits light of green color; in accordance with the second current range, the luminous warning field 202 emits light of yellow color; in accordance with the third current range, the luminous warning field 202 emits light of red color; and in accordance with the fourth current range, the luminous warning field 202 emits flickering red light.

Specifically, when the output current of the electrical socket 12' is in the safety current range (e.g. the value of the output current of the electrical socket 12' is between 0 and 11.25 amperes), the light control module 13 controls the light source device 132 to emit a green light to the luminous warning field 202, so as to make the luminous warning field 202 emit light of green color. When the output current of the electrical socket 12' is in the second current range (e.g. the value of the output current of the electrical socket 12' is between 11.25 and 13.5 amperes), the light control module 13 makes the luminous warning field 202 emit light of yellow color. When the output current of the electrical socket 12' is in the third current range (e.g. the value of the output current of the electrical socket 12' is between 13.5 and 14.25 amperes), the light control module 13 makes the luminous warning field 202 emit light of red color. When the output current of the electrical socket 12' is in the fourth current range (e.g. the value of the output current of the electrical socket 12' is greater than 14.25 amperes), the light control module 13 makes the luminous warning field 202 emit flickering red light. Consequently, the light control module 13 can make the luminousness of the luminous warning field 202 to change in accordance with the output current of the electrical socket 12'.

It is worth noting that, as described above, the light control module 13 emits light to the luminous warning field 202 in accordance with the output current, and the luminous warning field 202 of the power strip 1 alters the luminousness thereof in accordance with the output current to indicate the status of the output current. Therefore, the users can be informed of the status of current loading of the outlet instantly, in which shorts and fires resulting from the overload of the output current can be avoided before the power is overloaded.

Figure 4:
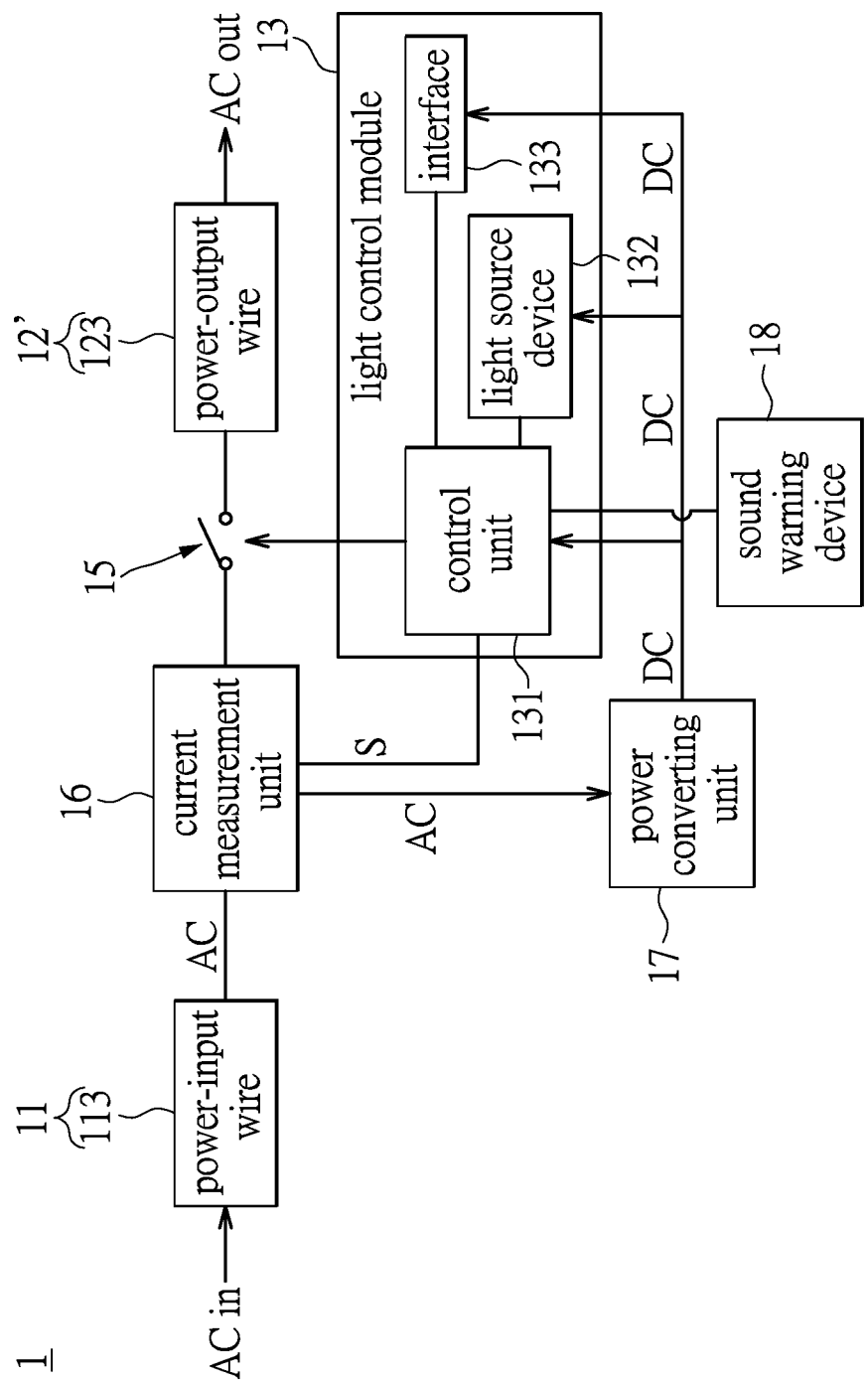
FIG. 4 illustrates a schematic circuit block diagram of the power strip in accordance with another embodiment of the instant disclosure.

Please refer concurrently to FIG. 4, which illustrates a schematic circuit block diagram of the power strip in accordance with another embodiment of the instant disclosure. The power strip 1 can further include a current measurement unit 16, which is coupled to the light control module 13. The current measurement unit 16, as a specific example, includes shunt resistors. The current measurement unit 16 can be disposed inside the power plug 11 and in electrical connection with a power-input wire 113 of the power plug 11 (FIG. 1). The current measurement unit 16 is for measuring the input current of the power plug 11 and generates a DC signal to the light control unit 13 according the input current measured. The light control module 13 can determine the output current of the electrical socket 12' according the DC signal generated by the current measurement unit 16, thus to control the light source device 132 to emit light.

The power strip 1 can further include a power converting unit 17 electrically connected between the power-input wire 113 of the power plug 11 and the light control module 13. The power converting unit 17 is for converting the AC power received to a direct current power (referred to as DC power) and supplies the light control module 13 with the DC power.

The power strip 1 can further include a sound warning device 18 coupled to the control unit 131 of the light control module 13. The sound warning device 18 make a warning sound when the output current of the electrical socket 12' is greater than the upper limit of the fourth current range (, e.g. when the output current of the electrical socket 12' is greater than 95% of the rated current), so as to alert the users the status of output current of the outlet.

Moreover, the power strip 1 can further include an overcurrent protection unit 15, which is coupled to the control unit 131 of the light control module 13 and is in electrical connection to the power-output wire 123 of the electrical socket 12'. The light control module 13 can control the overcurrent protection unit 15 to cut off the power transmission between the power plug 11 and the electrical socket 12' when the output current of the electrical socket 12' is greater than the rated current, whereby abnormal conditions, such as shorts and fires, resulting from the overload of output current can be avoided. In addition, the light control module 13 can control the overcurrent protection unit 15 to communicate the power transmission between the power plug 11 and the electrical socket 12' when the output current of the electrical socket 12' is lower than the upper limit of the second current range.

In an embodiment of the disclosure, the light control module 13 can include a control chip and an interface 133 for an external computer device being coupled thereto, and the rated current, parameter values of the current ranges (e.g. the upper and the lower limits of the current ranges), and the corresponding luminousness of the luminous warning field 202 can be set up via the external computer by the users. For example, the interface 133 can include a touch control display coupled to the control unit 131.

Furthermore, the number of current ranges can vary according to needs and be set up by the users. For example, the light control module defines only two current ranges, which are a safety current range and an alert current range. The safety current range is set up as between 0 and 90% of the rated current, and the lower limit of the alert current range is set up as greater than 90% of the rated current. When the output current of the electrical socket 12' is lower than 90% of the rated current, the luminous warning field 202 emits light of green color. When the output current of the electrical socket 12' is greater than 90% of the rated current, the luminous warning field 202 emits light of red color, and the sound warning device 18 beeps a warning sound.

In accordance with the instant embodiment, the present disclosure provides a power strip 1. The power strip 1 utilizes the light control module 13 to alter the luminousness of the luminous warning field 202 in accordance with the output current of the electrical socket, thereby indicating the status of output current of the outlet. In particular, the light control module 13 alters the light emitted to the luminous warning field 202 in accordance with the correspondence between the output current and each of the current ranges, so as to make the luminousness of the luminous warning field 202 to change. Especially, the current ranges are defined according to the rated current, whereby the power strip 1 can assume a more accurate and instant indication of the status of output power.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A power strip, comprising:
    a power plug having a power-input wire,
    an outlet block electrically connected to the power plug and having at least one electrical socket and a luminous warning field;
    a light control module disposed inside the outlet block for emitting a light to the luminous warning field in accordance with an output current of the electrical socket; and
    a current measurement unit disposed inside the power plug and electrically connected with the power-input wire of the power plug for measuring input current of the power plug and generating a DC signal to the light control unit;
    wherein the light control module defines at least two current ranges according to a rated current and alters the light emitted to the luminous warning field in accordance with the correspondence between the output current and each of the current ranges, so as to make the luminousness of the luminous warning field to change in accordance with the output current, wherein one of the current ranges is a safety current range, wherein the upper limit of the safety current range is greater than 50% of the rated current, wherein the light control module includes an interface for an external computer device being coupled thereto, and the rated current and parameter values of the current ranges are set up by the external computer.

2. The power strip of claim 1, wherein the upper limit of the safety current range is 75% of the rated current.

3. The power strip of claim 1, wherein the safety current range is between 0 and 75% of the rated current.

4. The power strip of claim 1, wherein the light control module defines four current ranges according to the rated current, the current ranges are the safety current range, a second current range, a third current range, and a fourth current range, the upper limit of the safety current range is 75% of the rated current, the second current range is between 75% and 90% of the rated current, the third current range is between 90% and 95% of the rated current, and the lower limit of the fourth current range is greater than 95% of the rated current.

5. The power strip of claim 4, wherein the light control module alters the light emitted to the luminous warning field to a green light in accordance with the correspondence between the output current and the safety current range, the light control module alters the light emitted to the luminous warning field to a yellow light in accordance with the correspondence between the output current and the second current range, the light control module alters the light emitted to the luminous warning field to a red light in accordance with the correspondence between the output current and the third current range, and the light control module alters the light emitted to the luminous warning field to a red flickering light in accordance with the correspondence between the output current and the fourth current range.

6. The power strip of claim 1, wherein light control module includes an interface, and the rated current, the current ranges, and the color of the light emitted to the luminous warning field in accordance with the correspondence between the output current and each of the current ranges are set up through the interface by a user.

7. The power strip of claim 1, wherein the current measurement unit is coupled to the light control module, and the current measurement unit is for measuring the output current of the electrical socket.

8. The power strip of claim 1, further including a sound warning device coupled to the light control module, wherein the sound warning device makes a warning sound when the output current of the electrical socket is greater than 95% of the rated current.

9. The power strip of claim 1, further including an overcurrent protection unit coupled to the light control module and in electrical connection to a power-output wire of the electrical socket, wherein the light control module controls the overcurrent protection unit to cut off the power transmission between the power plug and the electrical socket when the output current of the electrical socket is greater than the rated current.

* * * * *